Figure 1:
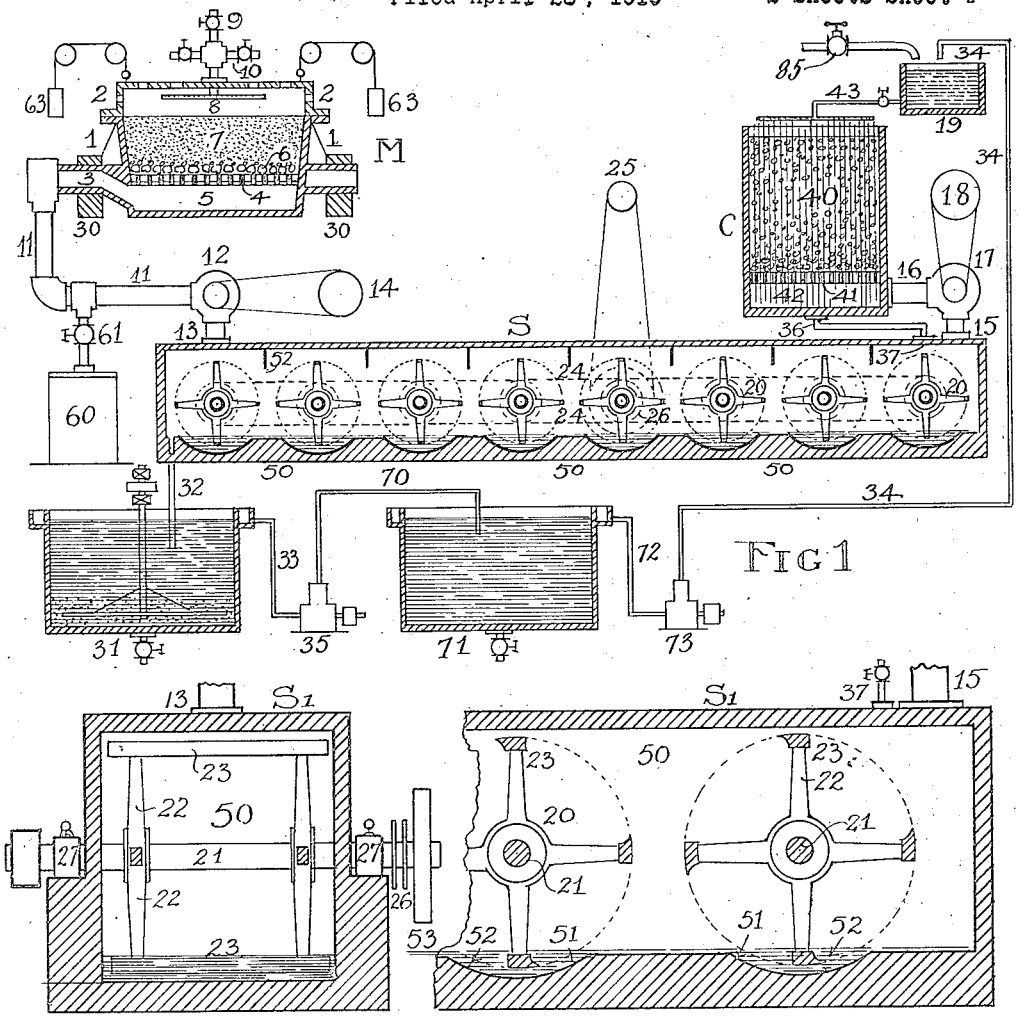

Jan. 8, 1924.

W. E. GREENAWALT

METALLURGICAL APPARATUS

Filed April 28, 1919

1,480,060

2 Sheets-Sheet 1

INVENTOR
William E Greenawalt

INVENTOR
William E Greenawalt

Patented Jan. 8, 1924.

1,480,060

UNITED STATES PATENT OFFICE.

WILLIAM E. GREENAWALT, OF DENVER, COLORADO.

METALLURGICAL APPARATUS.

Application filed April 28, 1919. Serial No. 293,174.

*To all whom it may concern:*

Be it known that I, WILLIAM E. GREENAWALT, a citizen of the United States, residing in the city and county of Denver and State of Colorado, have invented certain new and useful Improvements in Metallurgical Apparatus, of which the following is a specification.

The invention finds its best application in the wet treatment of finely ground ores, or in the treatment of metal bearing solutions with gases. The apparatus may be considered as a division and a continuation of that described in my copending applications, Serial No. 16,962, filed March 25, 1915; Serial No. 145,884, filed February 1, 1917, and Serial No. 140,738, filed January 5, 1917.

The treatment of ores, or metal bearing solutions, with gases, has always involved considerable difficulty. Rotating barrels, as in the barrel chlorination process, have largely been used, as also the gassing of a moistened charge by percolating the gas through the charge preparatory to leaching with a liquid. In other methods the gas was first absorbed in a liquid and then the liquid, with the gas in solution, was percolated through the charge. Another method consisted in showering the liquid downwardly in a tower against a rising current of gas. All these methods are more or less unsatisfactory, due largely to the slight solubility of any gas in a liquid, and especially so if the liquid is heated, and heating is frequently, if not generally, desirable to promote the reactions.

In the present apparatus the object is to overcome the inherent difficulties of the methods above enumerated, and provide a treatment which can be adjusted and regulated to obtain the maximum results.

This is done by containing the ore sludge, metal solution, or liquid, in a closed chamber and confining the reaction gas over the liquid, and then instead of attempting to pass the gas through the liquid or the liquid through the gas as in a scrubbing tower, the liquid is continuously and repeatedly sprayed, or atomized, into the gas. In this way a large surface of liquid is exposed to the action of the gas, and the temperature of the gases and liquid may be maintained fairly high to actively promote the chemical reactions, since the solubility of the gas in the liquid, is, in such a case, not a matter of great importance.

The apparatus is applicable to the treatment of ores, such as gold, silver, and copper ores, with gases, such as sulphur dioxide, chlorine, ammonia, etc., and is applicable to precipitation of metals from their solutions, such as the percipitation of gold, silver, and copper, from their solutions, with hydrogen sulphide. The process will be described more particularly with these applications in view.

Figures 2, 3:
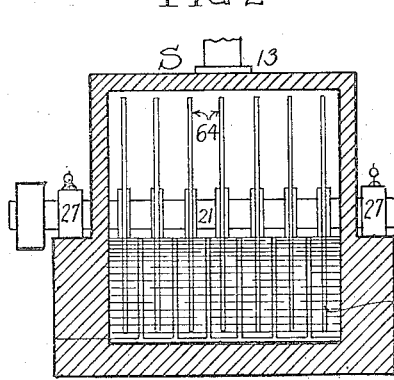
Figures 4, 5:
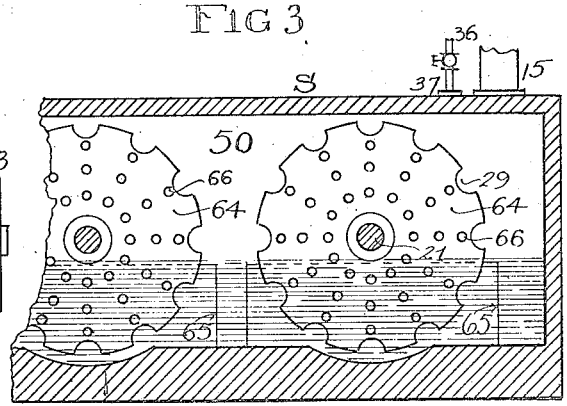
Figure 6:
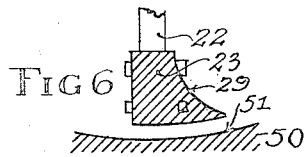
Figure 7:
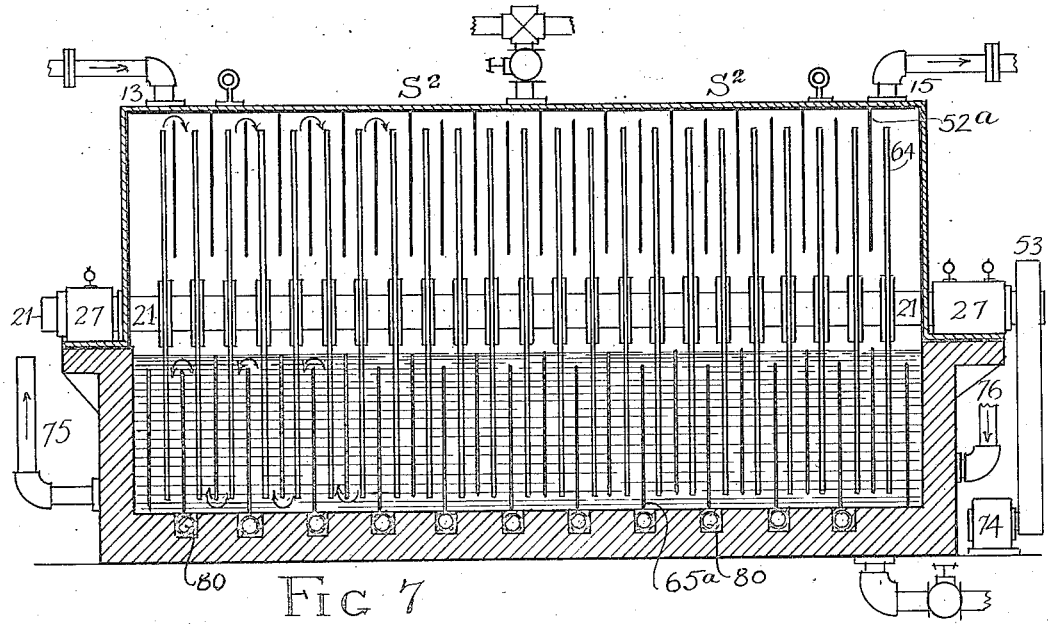
Figure 8:
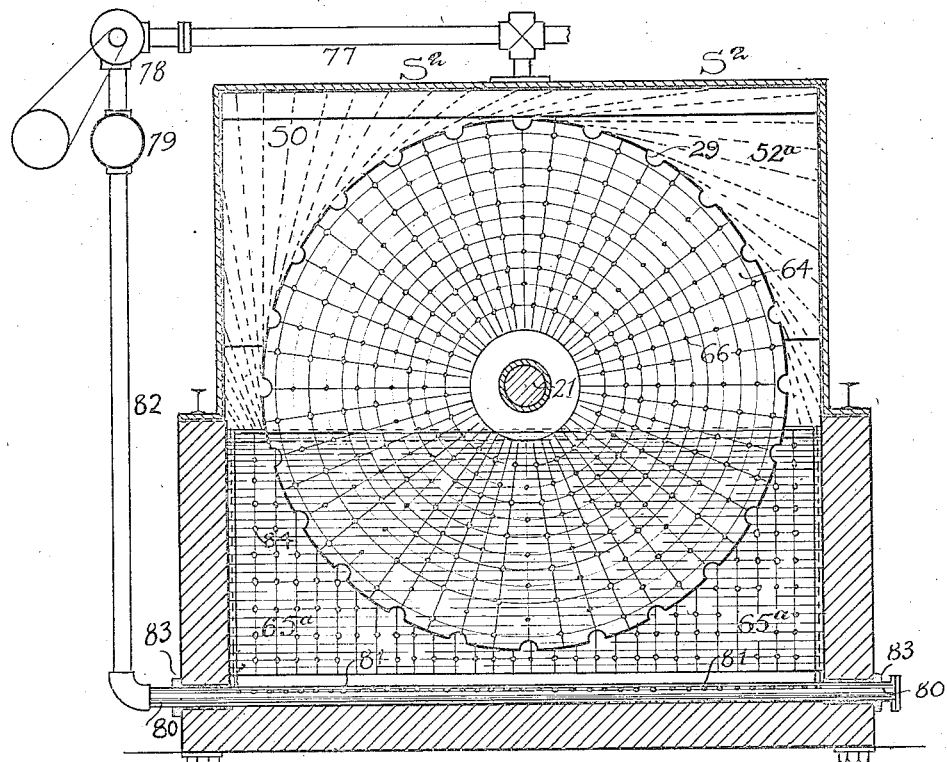

The apparatus is best described by referring to the accompanying drawings, in which Fig. 1 represents the apparatus in connection with accessory apparatus with which it may be used. Fig. 2 shows a detail cross-section, and Fig. 3 a detail longitudinal section, respectively, of Fig. 1. Fig. 4 and Fig. 5 represent a detail cross-section and a detail longitudinal section, respectively, of a modified apparatus. Fig. 6 shows a detail of the paddles. Fig. 7 and Fig. 8 show a longitudinal section, and a cross-section, respectively, of another modification of the apparatus.

Referring to the drawings, M shows a metallurgical furnace for producing a gas to be used in the treatment of the liquid. S, a scrubbing, or spraying chamber in which the gas and the liquid are confined for treatment, and C, a condensing tower through which the gases are passed after having passed through the spraying chamber where the fresh solution, or liquid, absorbs the excess of the impoverished gas.

Referring to Fig. 1, M shows a metallurgical furnace for conveniently generating a gas such as sulphur dioxide, and consists of a lower part, or holder 1, containing metal sulphides, and an upper part, or hood 2, to confine and direct the gases, such as air, steam, etc., through the charge by suction working from below. The holder 1 is mounted on trunnions, one of which is hollow, 3, and communicates with a chamber 5, in the bottom of the holder, formed by the grates 4. On top of the grates is placed a porous hearth 6, which supports the fine sulphide material 7, to be treated for the production of the reaction gas to be used in the spraying chamber.

The gas producing mixture is charged into the holder 1, and the exhauster 12 started, which induces a blast of air through the charge. The charge may be ignited or heated by introducing oil into the hood 2, through the pipe 9, by means of compressed air, and atomized and ignited by the igniter 8. The supply of oil is regulated by the valve 10. As the charge is ignited and heated the gases pass downwardly through the charge 7 and the porous hearth 6 through the grates 4 into the chamber 5 and through the hollow trunnion 3 into the pipe 11 and into the exhauster 12, which forces it into the spraying chamber S, through the inlet 13. The spraying chamber S, consists preferably of a long narrow tank 50, in which are a series of sprayers 20, driven by the sprockets 26, and sprocket chain 24 and actuated by the motor 25.

The sprayers 20, consist of a shaft 21, on which are mounted spindles 22, and connecting the spindles are paddles 23. The shaft is mounted on pillow blocks 27, on the outside of the chamber 50 in which the shafts rotate, and the shaft openings are maintained tight to prevent the escape of gas. The splashers are rotated at a fairly high speed, and dip into the liquid in the bottom of the chamber. In the bottom of the chamber 50, are, preferably, pockets 52, formed by depressions concentric with the circumference of the rotating paddles, and designated by 51, thus forming a pool of the liquid, and thus making it possible to use small amounts of the liquid and bring it all under effective treatment.

15 is the outlet for the gases, and by means of the exhauster 17 driven by the motor 18, the gases are exhausted from the spraying chamber S and through the pipe 16 are forced into the condensing tower C. The condensing tower C may be filled with inert material, such as quartz or coke 40, resting on a perforated support 41, and forming with the bottom of the condenser, ducts 42, by means of which the gases are evenly distributed and percolated evenly upwards through the mass of material 40. Water, or other liquid, is sprayed from the tank 19 through the sprayer 43 over the top of the condenser, through which it passes and absorbs the excess gas, and flows from the ducts 42, through the pipe 36 and opening 37, into the spraying chamber S. If the material to be treated is a metal solution to be precipitated or an ore sludge to be treated it is introduced into the tank 19 through the pipe 85 and is sprayed into the tower C and enters the spraying chamber S through the pipe 36.

The sprayers 20 are rotated at a fairly high speed, and as the paddles hit the pools of liquid, the liquid is sprayed upwardly into the gas in extremely fine particles. In this way the reactions between the gas and the liquid containing constituents capable of reacting with the gas, are effectively carried out.

The liquid, or sludge, is passed through the spraying chamber at a rate to warrant a thorough treatment, and issuing from the chamber through the liquid outlet 32 flows into a separating tank 31, where the solids are separated from the liquid. If, for example, ore is being treated, the gangue and resulting metal solution flowing into the separator, are separated by allowing the gangue to settle to the bottom of the separator and discharging it through the bottom opening, while the clear metal solution overflowing at the top is conveyed by means of the pipe 33, the pump 35, and the pipe 70, to the precipitating tank 71, where the metals are precipitated out of the solution, and the clear overflowing solution, flowing into the pipe line 72 to the pump 73, is elevated through the pipe line 34 to the storage tank 19 for re-use.

If it is desired to maintain a large volume of the sludge or liquid under treatment for a long time, the modification of the apparatus, as shown in Figs. 4 and 5 is preferred. By this modification a large pool of the liquid may be maintained in the bottom of the chamber, while the inflow and outflow may be quite small. In the treatment of ores with sulphur dioxide, chlorine, ammonia, etc., time is necessarily an important factor in the extraction of the metals from the ore, and while the gas in solution in the liquid is being consumed in making the metals soluble, fresh gas is all the while being absorbed by the liquid, as the liquid is steadily sprayed into the gas over it. In Figs. 4 and 5, the spraying is preferably done by parallel discs 64, which are partially immersed in the gas and partially submerged in the liquid. The discs are made with serrations 29 and perforations 66. As the discs are rapidly rotated the serrations and perforations assist in spraying the liquid into the gas while at the same time a certain amount of the gas is submerged in the liquid. In this way the gases and liquid are effectively and intimately mixed, and the liquid always maintained charged with the gas, while at the same time giving a desired agitation to the material being treated. The baffles 65$^a$ are preferably perforated, as shown by 84, Fig. 8, to entrain some of the submerged gas and assist in its further subdivision.

In order to give the liquid a uniform treatment and prevent short circuiting of the liquid through the chamber, it will usually be desirable to give the liquid a sinuous flow through the chamber from the liquid inlet toward the liquid outlet, as shown in Figs. 7 and 8. The discs, 64, spray the liquid into the gas over the liquid and submerge some of the gas in the liquid. The baffles 65$^a$, are arranged in alternate series having an opening at the bottom and an overflow on top, so as to give the liquid a sinuous flow through the chamber, while at the same time the agitating and atomizing discs rotate, preferably, between each set of baffles, or plates 65ª. Similarly, it may be desirable to baffle the gas, as shown by the baffles 52. It may also be desirable to exhaust some of the gas from the chamber, above the liquid, and force it into the liquid at the bottom. The exhauster 78, which has a greater suction than the exhauster 17, exhausts the gas from the chamber through the pipe 77, and forces it into the distributor 79, then through the distributing pipes 82, into the perforated pipes 80 in the bottom of the tank. The perforations are indicated by 81. The pipes entering the chamber at the sides are made tight against the escape of liquid from the tank by the stuffing boxes 83. The gas as delivered into the liquid in the bottom of the tank, and ascending through the spaces between the baffles, is atomized in contact with the liquid by the rotating discs. The gas, so introduced, will also help to keep the heavier particles of ore or precipitate from settling and keep it moving along toward the liquid outlet. The pipes 80 are so arranged that they may be connected and disconnected with the main on the outside of the tank, and by projecting the ends of the pipe through the tank, inspection, and cleaning if necessary, is made easy. If the material to be treated is an ore, the finely ground ore, in the form of an easy flowing sludge, is introduced into the chamber $S_2$ through the inlet pipe 76 and is exhausted through the outlet pipe 75.

The gas, instead of being produced in the gas generator, may be produced in the liquid, as for example, in the chlorination of ores, by adding bleaching powder and sulphuric acid to the ore sludge. The excess gas will rise up through the charge and occupy the space in the hood, and then the treatment will be the same as already described.

The gas, as well as the liquid, is preferably given a sinuous flow through the apparatus, as shown in Fig. 7, by arranging baffles in alternate series with the gas flow above and below the baffles. These baffles not only give the gas a sinuous flow through the apparatus, but also offer a largely increased surface for treating the liquid with the gas. The gas comes intimately in contact with the film of liquid on the surface, and as rapidly as the film becomes charged with the gas, it is washed down and fresh liquid exposed on the surface. Similarly, with the rotating discs; if the discs, for example, are approximately five feet in diameter, and each having a surface area, for both sides, of 30 sq. feet, and rotate at 60 R. P. M., there will be exposed 1,800 sq. feet of surface both to the liquid and the gas, per minute per disc; and if the chamber is 16 feet long inside and contains 32 discs, the total exposure would be 57,600 sq. feet of fresh surface per minute. This, in addition to the spray, or atomized liquid filling the hood, gives, it is believed, the most effective treatment possible involving the treatment of a liquid with a gas. The baffles are supposed to be about six inches apart: This will give three inches of liquid on each side of the rotating discs and the adjacent baffles.

The apparatus is particularly effective in the treatment of an ore sludge with a gas, and in the precipitation of metals from their solutions with a gaseous precipitant, such as the precipitation of copper from its solutions with hydrogen sulphide. A momentary contact with the gas will suffice to precipitate the metal from the solution, and no gas need be wasted. The sludge precipitate will readily flow out of the chamber on account of the continuous agitation, which will maintain the sulphide precipitate in suspension in the liquid. The process may also be applied to the precipitation of metal fumes as obtained, for example, by the chloridizing roasting of gold, silver, and copper ores, by hydrogen sulphide.

I claim:

1. In apparatus for treating liquids with gases, a lower section adapted to contain a liquid, an upper section engaging the lower section and forming a sealed chamber therewith, means for causing a flow of liquid through the lower section, means for causing a flow of gas through the upper section, rotary members within the chamber partly immersed in the gas and partly submerged in the liquid, and means alternating with the rotary members to give the liquid a sinuous flow through the chamber.

2. In metallurgical apparatus, a chamber adapted to contain a liquid and to confine a gas over the liquid, means for spraying the liquid in the chamber into the gas confined over it, and means for giving the liquid a sinuous flow through the chamber.

3. In metallurgical apparatus, a chamber adapted to contain a liquid and to confine a gas over the liquid, a series of parallel rotary members within the chamber partly submerged in the liquid and partly immersed in the gas, and a series of stationary perforated members submerged in the liquid alternating with the rotary members, said stationary members being arranged to subdivide the liquid in proximity to the rotary members.

4. In metallurgical apparatus, a chamber adapted to contain a liquid and to confine a gas over the liquid, means for causing a flow of liquid through the chamber, means for causing a flow of gas through the chamber over the liquid, means for exhausting a portion of the gas from above the liquid and forcing it under pressure through the liquid, and rotary means within the chamber for subdividing the gas in its ascent through the liquid.

5. In apparatus for treating liquids with gases, a stationary chamber adapted to contain a pool of liquid and to confine a gas over the pool and having a liquid inlet and a liquid outlet and a gas inlet and a gas outlet above the normal surface of the liquid, a series of sprayers within the chamber adapted to spray the liquid into the gas, and suction means adapted to flow the gas from the gas inlet toward the gas outlet successively through the series of liquid sprays and means for maintaining a uniform liquid level in the chamber.

6. In metallurgical apparatus, a chamber adapted to contain a liquid and to confine a gas over the liquid, rotary means within the chamber for intimately mixing the liquid and the gas, and means for agitating the liquid with the gas.

7. In metallurgical apparatus, a chamber adapted to contain a liquid and to confine a gas over the liquid, means for causing a flow of liquid through the chamber, an exhauster for causing a flow of gas through the chamber, rotary means within the chamber for bringing the liquid and the gas in intimate contact by subdivision, and means for exhausting a portion of the gas from above the liquid and forcing it under pressure through the liquid.

8. In metallurgical apparatus, a chamber adapted to contain a liquid and to confine a gas over the liquid, means for causing a flow of liquid through the chamber, an exhauster for causing a flow of gas through the chamber over the liquid, and means having a greater suction than the exhauster for withdrawing a portion of the gas from the main gas stream and forcing it under pressure through the liquid.

9. In metallurgical apparatus, a chamber adapted to contain a liquid and to confine a gas over the liquid, means for causing a flow of liquid through the chamber, suction means for causing a flow of gas through the chamber over the liquid, means within the chamber for spraying the liquid into the gas, and means for withdrawing a portion of the gas from above the liquid and injecting it into the lower portion of the liquid.

10. In metallurgical apparatus, a chamber adapted to contain a liquid and to confine a gas over the liquid, rotary means within the chamber partly submerged in the liquid and partly immersed in the gas, and separate means for agitating the liquid with the gas.

11. In metallurgical apparatus, a stationary chamber adapted to contain a pool of liquid and to confine a gas over the pool, a rotary member within said chamber mounted on a horizontal shaft and partly submerged in the liquid and partly immersed in the gas, said rotary member having means for submerging some of the gas in the liquid, and stationary perforated members in proximity to the rotary member, said stationary members being arranged to subdivide and to retard the movement of the liquid induced by the rotary members, and means for maintaining a uniform liquid level in the chamber.

12. In apparatus for treating liquids with gases, a stationary chamber adapted to contain a pool of liquid and to confine a gas over the pool, a series of rotary members within the chamber contacting with the liquid and with the gas and adapted to spray some of the liquid into the gas, means arranged for flowing the liquid through the chamber and progressively bringing the stream of liquid in contact with the rotary members, and means for flowing a stream of gas through the chamber over the liquid and progressively passing it through the liquid sprays induced by the rotary members, and means for maintaining substantially the same liquid level in the chamber.

13. In metallurgical apparatus, a chamber adapted to contain a pool of liquid and to confine a gas over the pool, partitions dividing the lower portion of the chamber into sections and arranged to give the liquid a sinuous flow through the chamber, means for spraying some of the liquid in the respective sections into the gas over the liquid, and means for flowing the gas through the liquid spray in the upper portion of the chamber.

14. In metallurgical apparatus, a chamber adapted to contain a pool of liquid and to confine a gas over the liquid, partitions dividing the lower portion of the chamber into sections, means for spraying a portion of the liquid into the gas over the liquid, and means for exhausting a portion of the gas from above the liquid and forcing it through the liquid in the respective sections of the chamber.

15. In metallurgical apparatus, a chamber adapted to contain a pool of liquid and to confine a gas over the liquid, partitions dividing the lower portion of the chamber into sections and arranged to allow the liquid to flow progressively through the various sections, means for flowing a current of gas through the chamber over the liquid, and means for withdrawing some of the gas from above the liquid and forcing it through the liquid.

16. In metallurgical apparatus, a chamber adapted to contain a pool of liquid and to confine a gas over the liquid, partitions dividing the lower portion of the chamber into sections and arranged to allow the liquid to flow progressively through the various sections, and means for withdrawing some of the gas from above the liquid and forcing it through the liquid of the pool in the various sections.

17. In apparatus for treating liquids with gases, a chamber adapted to contain liquid and to confine gas over the liquid and having vertical partitions dividing the lower portion of the chamber into compartments, a horizontal shaft passing through said compartments, rotary members in said compartments partly submerged in the liquid and partly immersed in the gas mounted on said shaft, and means for flowing the liquid progressively through said compartments from the liquid inlet toward the liquid outlet and means for maintaining substantially the same liquid level in all of said compartments.

18. In apparatus for treating liquids with gases, a tank adapted to contain liquid and having vertical partitions dividing the lower portion of the tank into compartments, a horizontal shaft passing through the respective compartments, rotary members in said compartments partly submerged in the liquid and partly immersed in the gas over the liquid mounted on said shaft said rotary members being adapted to immerse gas in the liquid in its rotary movement, and means for flowing the liquid progressively through the respective compartments of the tank and means for maintaining substantially the same liquid level in all of said compartments.

19. In apparatus for treating liquids with gases, a chamber adapted to contain liquid and having its lower portion divided into compartments said compartments communicating with one another, a horizontal shaft passing through the respective compartments, rotary members partly submerged in the liquid and partly immersed in the gas over the liquid in the respective compartments mounted on said shaft said rotary members being adapted to submerge and subdivide some of the gas in the liquid, perforated members in proximity to the rotary members to retard and further subdivide the gas in the liquid, and means for flowing the liquid progressively through the respective compartments of the chamber.

WILLIAM E. GREENAWALT.

Witnesses:
A. S. LONG,
SYLVIA PEARL JACOBS.